United States Patent [19]

Oestmann

[11] Patent Number: 4,557,157
[45] Date of Patent: Dec. 10, 1985

[54] VEHICLE STEERING DIFFERENTIAL
[75] Inventor: Eldon D. Oestmann, Morton, Ill.
[73] Assignee: Caterpillar Tractor Co., Peoria, Ill.
[21] Appl. No.: 474,858
[22] Filed: Mar. 14, 1983
[51] Int. Cl.[4] ............................................. F16H 57/02
[52] U.S. Cl. ........................................ 74/607; 74/675; 74/606 R
[58] Field of Search ...................... 74/675, 660, 665 R, 74/665 GB, 665 L, 750 R, 770, 789, 792, 714, 710, 606 R, 607, 417, 421 A, 424, 682; 180/6.2, 6.44

[56] References Cited

U.S. PATENT DOCUMENTS

| | | | |
|---|---|---|---|
| 1,309,978 | 7/1919 | Baker | 74/695 |
| 2,400,728 | 5/1946 | Akers | 74/714 |
| 2,651,216 | 9/1953 | Alden | 74/713 |
| 2,730,182 | 1/1956 | Sloane | 74/714 |
| 2,730,914 | 1/1956 | Rockwell | 74/695 |
| 3,044,320 | 7/1962 | Oudry | 74/710.5 |
| 3,260,134 | 7/1966 | Bowen | 74/714 |
| 3,450,218 | 6/1969 | Looker | 180/6.44 |
| 3,857,301 | 12/1974 | Hanks et al. | 74/417 |
| 3,905,089 | 9/1975 | Osenbaugh et al. | 74/713 |
| 3,966,005 | 6/1976 | Binger | 180/6.44 |
| 4,036,076 | 2/1976 | Anderson | 74/409 |
| 4,126,201 | 9/1977 | Stevens | 180/70 R |
| 4,170,152 | 7/1977 | Windish et al. | 74/606 R |
| 4,245,524 | 1/1981 | Dammon | 74/714 |
| 4,423,644 | 1/1984 | Coutant | 74/714 |
| 4,434,680 | 3/1984 | Riediger | 74/714 |
| 4,471,669 | 9/1984 | Seaberg | 74/714 |

FOREIGN PATENT DOCUMENTS

| | | |
|---|---|---|
| 0014122 | 8/1980 | European Pat. Off. . |
| 8200867 | 3/1982 | European Pat. Off. . |
| 1112410 | 8/1981 | Fed. Rep. of Germany . |
| 2339713 | 8/1977 | France . |

Primary Examiner—Rodney H. Bonck
Assistant Examiner—David Novais
Attorney, Agent, or Firm—Charles E. Lanchantin, Jr.

[57] ABSTRACT

A vehicle steering differential (10) includes a case (12) defining a chamber (76), an opening (78) on a transverse axis (36) communicating therewith, and a mounting surface (80) about the opening (78). An input pinion gear (14) and a bevel gear (18) driven by the pinion gear (14) are rotatably connected within case (12) in right angle intermeshing relationship by a body (20) releasably secured to the mounting surface (80). A radial opening (82) is defined in the case (12), and a steering motor (16) has a shaft (88) that extends through the radial opening (82) into driving engagement with the pinion gear (14), with the body (20) supporting the steering motor (16). The body (20) includes an arm (110) and a collar (122) releasably secured to the arm (110) for supporting the steering motor (16).

21 Claims, 6 Drawing Figures

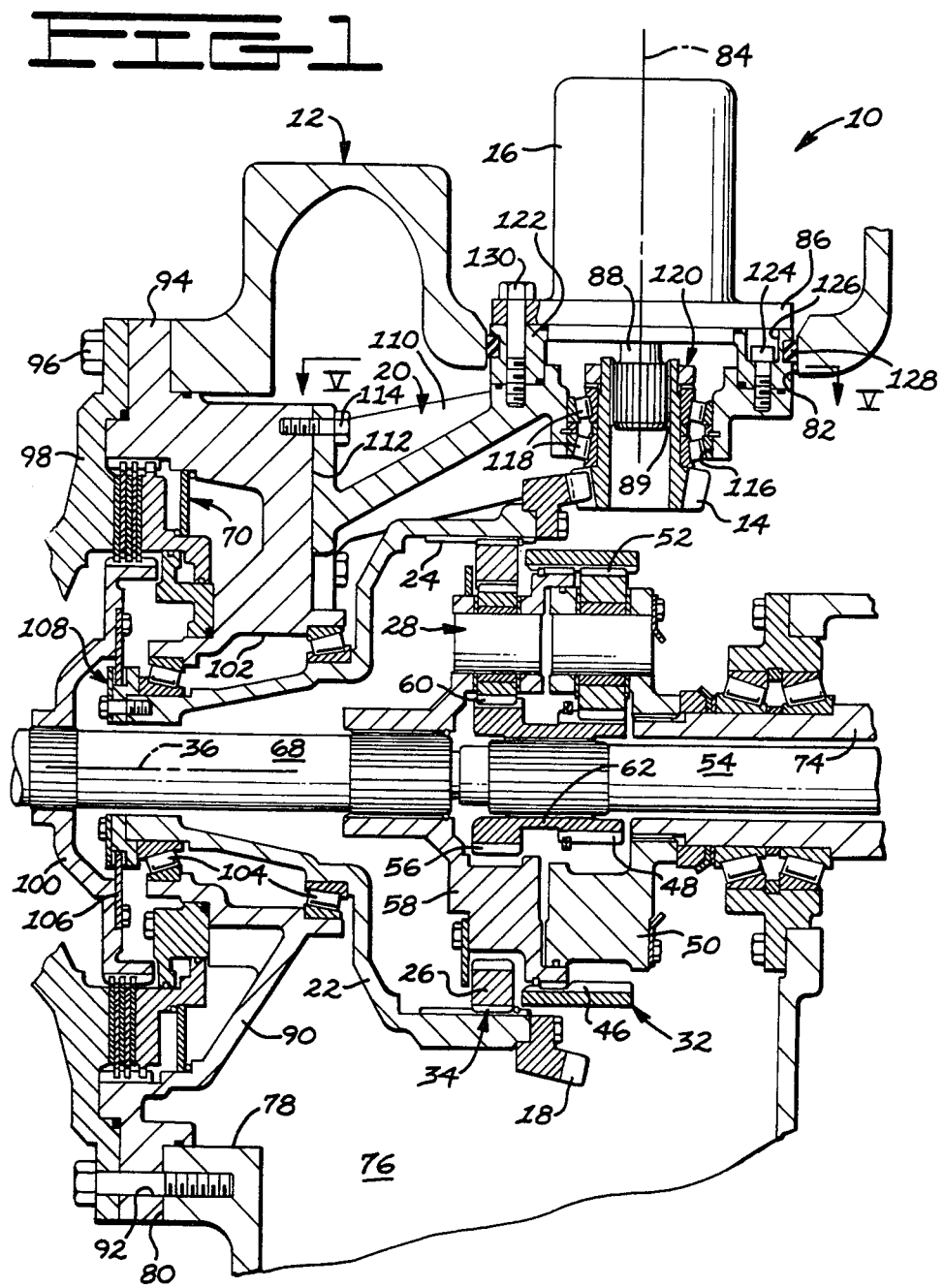

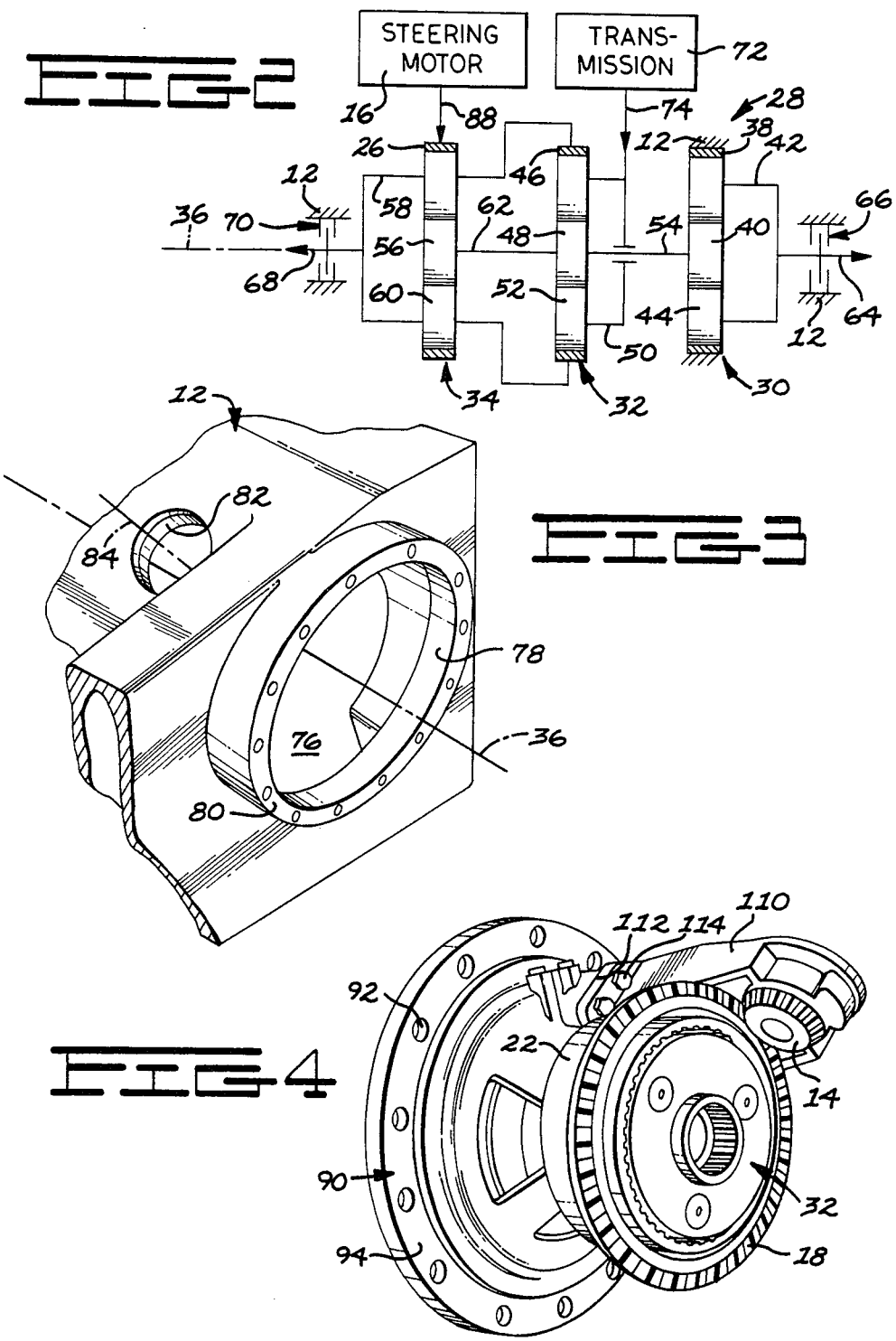

VEHICLE STEERING DIFFERENTIAL

TECHNICAL FIELD

This invention relates generally to a vehicle steering differential, and more particularly to the support for certain steering elements relative to a vehicle case.

BACKGROUND ART

In order to avoid the discontinuous delivery of power to the opposite endless track chains of an earthmoving tractor during turning various differential steering mechanisms have been proposed. One typical differential steering mechanism employs a pair of oppositely disposed planetary gear steering units whose output members rotate the sprockets that drive the track chains. One element of each steering unit is driven by the transmission of the tractor through appropriate gearing to provide the primary drive power path, while another element of each steering unit is driven by an auxiliary system to provide a secondary steering drive power path. A hydraulically driven steering motor delivers power to the oppositely disposed elements or gears by way of a transverse shaft system parallel to the central axis of the mechanism. In operation, one gear at one side of the tractor is rotatably driven at the same speed, but in the opposite direction to a counterpart gear on the other side to effect a turn.

Such prior steering differentials have been relatively complex in construction and costly. One reason for this is that a large vehicle case has been required to contain certain steering components, such as the steering motor and steering shaft system, within it.

Another problem is that when the steering motor is mounted within the vehicle case it is relatively inaccessible for convenient servicing. When the steering motor is mounted externally in order to improve servicing thereof it is difficult to maintain the relationship between its centerline and the centerline of the associated gearing. Specifically, precision boring of the relatively large vehicle case is a costly manufacturing step, and this is especially true when the axes of the related cylindrical openings are arranged at a right angle to each other. If the steering motor is radially oriented relative to the transverse axis of the steering mechanism, which is often particularly desirable in the limited space available in the tractor, the steering power path can be by way of an intermeshing pinion and bevel gear set. However, maintaining the desired gear tooth loading action and amount of backlash in that gear set is difficult when the rotary elements are mounted on spaced apart members which are not only subject to misalignment problems but also to differential deflection of the elements in use.

Accordingly, it would be advantageous to provide a relatively simple steering differential which will have improved structural integrity between the rotary elements thereof, while allowing the steering motor to be mounted generally exteriorly of the case for more convenient servicing and generally at a right angle to the transverse central axis at a particularly desirable location.

The present invention is directed to overcoming one or more of the problems set forth above.

DISCLOSURE OF THE INVENTION

In accordance with one aspect of the present invention, a vehicle steering differential includes a vehicle case defining an internal chamber, a laterally outwardly extending opening, and a mounting surface about the opening. A bevel gear is driven by a pinion gear, and body means is provided for rotatably supporting the pinion gear and the bevel gear, with the body means being releasably secured to the case solely at the mounting surface and extending within the chamber.

In accordance with another aspect of the invention, a steering differential having a steering motor and a vehicle case defining an internal chamber and first and second openings communicating with the chamber, includes a body releasably connected to the case and extending through the first opening into the chamber, a support member extending from the body toward the second opening, and means for mounting the steering motor on the support member at the second opening.

Specifically, the invention contemplated body means releasably secured to the vehicle case and extending transversely therewithin from only one side of the vehicle for rotatably supporting a pinion gear and a bevel gear in a structurally solid intermeshing right angle relationship. An externally mounted steering motor is releasably mounted on the body means through a collar or adapter ring which is seated within a radial opening in the case, and with the steering motor being in driving engagement with the pinion gear for effecting steering of the tractor.

BRIEF DESCRIPTION OF THE DRAWINGS

FIG. 1 is a fragmentary, diagrammatic, cross-sectional view of a first embodiment of the vehicle steering differential of the present invention with certain portions shown in elevation for clarity;

FIG. 2 is a diagrammatic, elevational view or generalized planetary schematic of the vehicle steering differential of FIG. 1, showing in block form a steering motor input and a separate transmission unit input for illustrating the power paths associated with these units;

FIG. 3 is a fragmentary, diagrammatic and pictorial view of a portion of the vehicle case illustrated in FIG. 1;

FIG. 4 is a diagrammatic and pictorial view of the intermeshing pinion and bevel gears, and the body means rotatably supporting the gears as shown in FIG. 1;

BEST MODE FOR CARRYING OUT THE INVENTION

Figure 5:
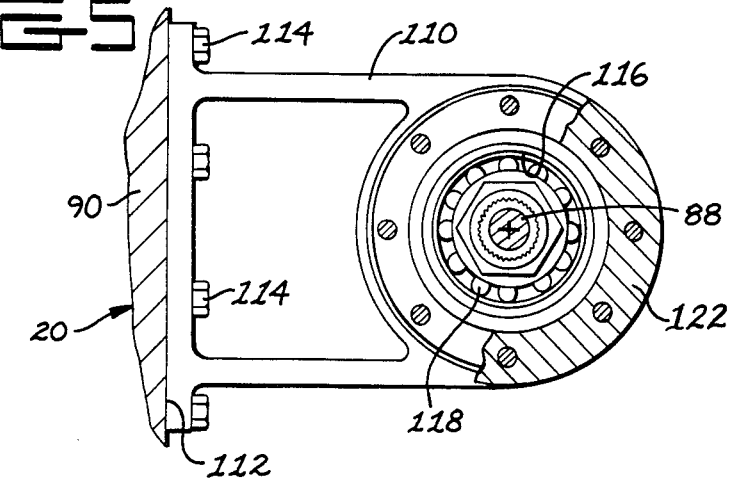
FIG. 5 is a fragmentary sectional and elevational view of the body means as taken along line V—V of FIG. 1 with a portion of an adapter ring broken away for clarity.

FIG. 1 illustrates a vehicle steering differential 10 constructed in accordance with the present invention and including a vehicle case 12, an input pinion gear 14 driven by a hydraulic steering motor 16, a bevel gear 18 driven by the pinion gear, and body means 20 for releasably connecting these members to the case. The bevel gear 18 is releasably connected to a rotating housing member 12 having an internal spline 24 for conjoint rotation of a planetary ring gear 26. When the ring gear is rotated it provides the steering input or secondary power path to a planetary transaxle or cross drive mechanism generally identified by the number 28.

Attention is now directed to FIG. 2 wherein the planetary cross drive mechanism 28 is shown in simplified block-like form. It has first, second and third interconnected planetary gear sets 30, 32 and 34 respectively aligned along a central transverse axis 36 oriented normal to the usual forward and reverse direction of vehicle travel. The first planetary gear set 30 includes ring gear, sun gear and planet carrier elements 38, 40 and 42 of the typical type wherein a plurality of planet gear elements 44 are rotatably mounted on the carrier element and are intermeshed with the ring and sun gear elements. In the instant embodiment the first ring gear 38 is fixedly secured to the case 12 so that the first planetary gear set provides a speed reduction. The second planetary gear set 32 includes ring gear, sun gear, planet carrier and planet gear elements 46, 48, 50 and 52 respectively. As is shown in FIG. 2, the second sun gear 48 is directly connected to first sun gear 40 by a shaft 54. Furthermore, the third planetary gear set 34 includes the ring gear 26 mentioned above with reference to FIG. 1, and sun gear, planet carrier and planet gear elements 56, 58 and 60. The third planet carrier 58 is connected for joint rotation with the second ring gear 46, and the third sun gear 56 is connected for joint rotation with the second sun gear 48 through a shaft 62.

The first planet carrier 42 on the right side when viewing FIG. 2 serves as the first or right output member 64, and a conventional service brake assembly 66 can be associated therewith to selectively brake the right side of the vehicle. On the left side the third planet carrier 58 serves as the second output member 68 and a similar service brake assembly 70 can connect it to the case 12 to brake the left side.

Transmission means 72 is provided for powerably rotating an input member 74 connected to rotate with the second planet carrier 50, so that that element serves as the primary power path to the cross drive mechanism 28. Preferably, the transmission means is a multi-speed, reversible transmission driven by the engine of the vehicle, not shown.

The case 12, shown in part in FIG. 3, generally contains the cross drive mechanism 28 of FIG. 2 therein. The case defines a transversely extending chamber 76 and a laterally extending and generally cylindrical opening 78 communicates with the chamber and is concentrically disposed along the transverse axis 36. An upright, planar and annular mounting surface 80 is defined about the opening, and a second smaller and generally cylindrical opening 82 communicates with the internal chamber and is arranged along a radial axis 84 at a right angle to and intersecting the central transverse axis 36.

As is shown in FIG. 1, the steering motor 16 is oriented substantially on the radial axis 84 and is primarily externally mounted for quick serviceability on the body means 20. It has a stepped cylindrical mounting flange 86 and a drive shaft 88 which is releasably secured to the hollow pinion gear 14 by a spline connection 89.

The body means 20 illustrated in FIGS. 1 and 4 includes firstly an annular body defining a relatively rigid brake housing 90 which is releasably connected to the case 12. A plurality of bores 92 are defined through the mounting flange 94 of the brake housing and a plurality of fasteners 96 extend therethrough to be screwthreadably received in the case immediately about the periphery of the opening 78. A support spindle 98 is also secured thereto by these fasteners, but this is incidental to the present invention. The left service brake assembly 70 is generally contained within the spindle and brake housing and is spring engaged and hydraulically released. When it is selectively engaged by the vehicle operator a hub member 100 splined to the left output member 68 is effectively connected to the stationary case for braking purposes. The brake housing has a stepped bore 102 therethrough, and a pair of opposed tapered roller bearing assemblies 104 are seated in the stepped bore to rotatably support the housing member 22. An annular plate 106 is secured to the hub member 100 and is received in a positioning mechanism 108 secured to the rotating housing member 22 for limiting the movement of the hub member along the transverse central axis 36.

Secondly, as shown in the drawings of FIGS. 1 and 5, the body means 20 includes a separate supporting arm or bracket 110 which cantileverably extends axially inwardly from a mounting face 112. It is releasably secured to that mounting face by a plurality of fastening bolts 114 screwthreadably received in the brake housing 90. A cylindrical bore 116 is defined through the bracket 110 for receiving a pair of opposed tapered roller bearing assemblies 118. The pinion gear 14 is rotatably mounted in these bearing assemblies and is releasably secured thereto by a retainer assembly 120 screwthreadably connected to the periphery of the hollow pinion gear and locked in place when the radial position thereof is defined within a preselected band.

Thirdly, the body means 20 includes an adapter ring or collar 122 releasably secured to the bracket 110 by a recessed plurality of fasteners 124 screwthreadably received in the bracket and extending through stepped bores 126. An annular seal means 128 is received in a recess about the periphery of the collar to sealingly engage against the internal surface of the opening 82 for excluding dirt from and containing lubricant within the internal chamber 76.

A plurality of somewhat longer fasteners 130 extend through the mounting flange 86 and through the collar to be screwthreadably received in the bracket in order to releasably connect the steering motor 16 to body means 20.

INDUSTRIAL APPLICABILITY

During assembly, the housing member 22 with the bevel gear 18 thereon can be mounted within the roller bearing assemblies 104 as by the adjustment of the positioning mechanism 108 on the outside end of the housing member. The hollow pinion gear 14 can be rotatably mounted within the bore 116 of the bracket 110 by adjusting and locking the roller bearing assemblies 118 in place through screwthreaded loading of the retainer assembly 120. Advantageously, the radial disposition of the pinion gear is not too critical and the bracket and pinion gear can be secured to the brake housing 90 by the bolts 114. In order to establish the desired back-lash and contact pattern between the teeth of the pinion and bevel gears it may be desirable to add shims, not shown, between the bracket and brake housing at the mounting face 112. One of the features of this construction is that this subassembly can be made on a bench set-up and then be hoisted into position and conveniently inserted within the opening 78 and close confines of the case 12. Preferably, the elements of the second and third planetary gear sets 32, 34 are positioned within the housing member 22 and form a part of this subassembly as is shown in FIG. 4. When the brake housing 90 is secured against the mounting surface 80 by the fasteners 96, the pinion gear 14 is substantially aligned with the radial axis 84 of the second opening 82 of the case. It then is a simple matter to insert the collar 122 into the second opening and secure it to the bracket by engagement of the fasteners 124, and to subsequently secure the steering motor 16 to the collar by engagement of the fasteners 130 to the bracket. In this way the steering motor, pinion and bevel gears are mounted serially to only one rigid surface 80 around the first opening 78, with the collar and its seal means 128 being capable of slip fit sealed engagement within the second opening 82. Thus, structural integrity is maintained because the axes 84,36 of the intermeshing right angle gears 14,18 are related through serially connected elements to only one mounting surface. If the case 12 were to deflect in use, or if the second opening 82 were bored slightly inaccurately, this would not matter with the instant construction.

In operation, and with reference to FIG. 2, the shaft 88 of the steering motor 16 and thereby the third ring gear 26 are held against rotation for straight ahead operation of the vehicle. Under these circumstances the transmission 72 is engaged in the desired forward or reverse gear and the input member 74 is powerably rotated to drive the cross drive mechanism 28 and subsequently the left and right output members 68,64 at the same speed and direction. The planetary connections, the ratios of the numbers of teeth in the planetary gear sets 30, 32 and 34, and the stationary first ring gear 38 are established to achieve this.

If a steering correction is desired while the vehicle is traveling, the steering motor is actuated by a suitable control system, not shown, to drive it in either direction of rotation at the selected speed simultaneously with rotation of the second planet carrier 50 by the transmission 72. This would cause the third ring gear 26 to be driven in such a way as to cause the speed of the third planet carrier 58 to be reduced, for example, to make a left turn. Since the sun gears 40, 48 and 56 are connected together and speed up, the speed of the first planet carrier 42 is forced to also speed up. A steering connection to the left results because the speed of the left output member or drive axle 68 decreases to the same degree as the speed of the right output member or drive axle 64 increases. For a more specific operational understanding of the cross drive mechanism 28 note is made of the subject matter of U.S. Pat. No. 4,434,680 issued Mar. 6, 1984 to C. W. Riediger, et al. the full contents of which are incorporated herein by reference.

SECOND EMBODIMENT

Figure 6:
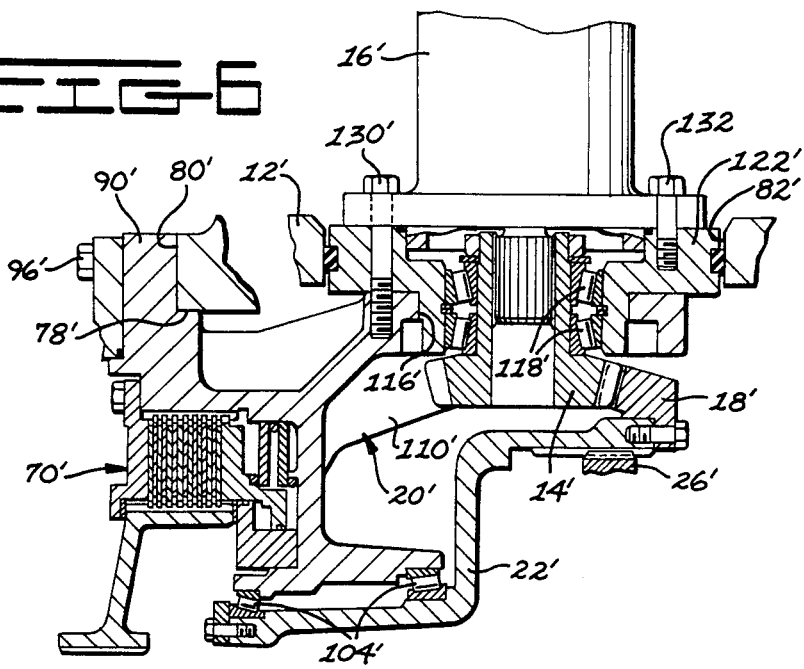
FIG. 6 is a fragmentary, diagrammatic, cross-sectional view of a second embodiment of the vehicle steering differential of the present invention that can be compared with FIG. 1.

FIG. 6 illustrates a second embodiment that differs from the first embodiment primarily in that the steering motor supporting body means 20' includes a brake housing 90' with an integrally formed supporting extension arm 110' thereon. A secondary distinction is that the pinion gear 14' is rotatably mounted on the collar 122' through the bearing assemblies 118' rather than directly on the extension arm 110'. Accordingly, the mating relationship of the pinion and bevel gears 14',18' are preestablished as a subassembly before insertion into the case 12'. Then the fasteners 130' are screwthreadably disengaged from the extension arm 110' so that the steering motor 16', collar 122' and pinion gear rotatably secured thereto in its proper radial position can be removed as a group. In such instance the foreshortened fasteners 132 secure the collar and steering motor together. The body means 20', the rotatably housing member 22' and associated planetary gear set elements, not shown in FIG. 6, are thereafter inserted axially into first opening 78' of the case and the brake housing 90' secured to the annular mounting surface 80'. Subsequently, the collar, steering motor and pinion gear are inserted radially into the second opening 82' of the case and the fasteners 130' coupled to the extension arm 110'. This second embodiment may be necessary in certain instances where space is at a premium within the case.

Thus, the embodiments of the vehicle steering differential of the present invention provide a simple and serviceable mounting system for rotatably supporting a pinion gear and bevel gear in a precisely intermeshing right angle relationship cantileverably within a case from a mounting surface disposed peripherally about a laterally oriented case opening. Moreover, with this system the axis of the pinion gear is oriented in relatively close alignment with the axis of a smaller radially oriented case opening to permit convenient insertion of a steering motor into a driving relationship with the pinion gear. A slip fit sealed joint at the radial opening contributes to maintaining the structural integrity of the body means mounting the gears and the steering motor.

Other aspects, objects and advantages will become apparent from a study of the specification, drawings and appended claims.

I claim:

1. A vehicle steering differential comprising:
   a vehicle case defining an internal chamber, a radial opening communicating with the chamber, a laterally outwardly extending axial opening having a transverse axis, and a laterally outwardly facing mounting surface disposed about the axial opening;
   an input pinion gear;
   a bevel gear driven by the pinion gear; and
   body means for rotatably supporting the pinion gear on a radial axis and the bevel gear on the transverse axis within the chamber in an intermeshing relationship, the body means including an annular body and a supporting arm, the annular body being releasably secured to the case solely at the mounting surface, and the supporting arm cantileverably extending from the annular body and within the case and supporting the pinion gear in general alignment with the radial opening of the case.

2. The vehicle steering differential of claim 1 including steering motor means extending into the radial opening for driving engagement with the pinion gear, the supporting arm solely supporting the steering motor means primarily exteriorly of the vehicle case.

3. The vehicle steering differential of claim 2 wherein the body means includes a collar and seal means for sealing between the collar and the vehicle case at the radial opening.

4. The vehicle steering differential of claim 3 wherein the steering motor means includes a steering motor releasably secured to the collar.

5. The vehicle steering differential of claim 1 wherein the supporting arm defines a cylindrical bore and the body means includes bearing means for rotatably mounting the pinion gear in the bore of the supporting arm along the radial axis.

6. The vehicle steering differential of claim 5 including second bearing means for rotatably mounting the bevel gear in the annular body along the transverse axis.

7. The vehicle steering differential of claim 5 including a steering motor and a collar, the collar being releasably secured to the supporting arm and the steering motor being releasably secured to the collar and extending exteriorly of the vehicle case.

8. The vehicle steering differential of claim 1 including a steering motor and fastening means for releasably connecting the steering motor to the supporting arm, the steering motor projecting outwardly of the case.

9. The vehicle steering differential of claim 8 wherein the body means includes an annular member releasably secured to the supporting arm and capable of slip fit engagement with the vehicle case within the radial opening.

10. The vehicle steering differential of claim 9 wherein the steering motor has a shaft extending through the radial opening into driving engagement with the pinion gear.

11. A vehicle steering differential for releasably securing a steering motor to a vehicle case defining an internal chamber, axial and radial openings communicating with the chamber and a laterally outwardly facing mounting surface peripherally about the axial opening, comprising:
   an annular body releasably connected to the mounting surface of the case and extending into the chamber via the axial opening;
   a support arm cantileverably extending from the body toward the radial opening within the vehicle case; and
   ring means for mounting the steering motor on the support arm at the radial opening such that the steering motor projects outwardly of the vehicle case for servicing and the ring means is in slip fit sealed engagement with the radial opening.

12. The vehicle steering differential of claim 11 wherein the support arm defines a cylindrical bore and including a pinion gear and bearing means for rotatably mounting the pinion gear in the bore of the arm.

13. The vehicle steering differential of claim 12 wherein the steering motor has an output shaft releasably connected to the pinion gear.

14. The vehicle steering differential of claim 11 wherein the ring means includes a collar and an annular seal peripherally connected to the collar and sealingly engaging the radial opening the collar being releasably secured to the support arm.

15. The vehicle steering differential of claim 14 including a pinion gear driven by the steering motor and bearing means for rotatably mounting the pinion gear in the ring means.

16. The vehicle steering differential of claim 15 including a bevel gear and other bearing means for rotatably mounting the bevel gear in the annular body in right angle intermeshing engagement with the pinion gear.

17. The vehicle steering differential of claim 11 wherein the annular body defines a stepped bore and including a bevel gear and bearing means for rotatably mounting the bevel gear in the stepped bore.

18. The vehicle steering differential of claim 17 including a pinion gear and another bearing means for rotatably mounting the pinion gear on the support arm, the pinion gear being intermeshed with the bevel gear and driven by the steering motor.

19. The vehicle steering differential of claim 11 wherein the support arm is an integral part of the annular body and defines a cylindrical bore, and the ring means includes an adapter collar releasably secured to the arm and extending into the radial opening.

20. The vehicle steering differential of claim 19 including a pinion gear and bearing means for rotatably mounting the pinion gear in the adapter collar.

21. The vehicle steering differential of claim 20 including a bevel gear and bearing means for rotatably mounting the bevel gear in the annular body, the bevel gear being intermeshed with the pinion gear.

* * * * *